United States Patent
Karame et al.

(10) Patent No.: US 10,346,619 B2
(45) Date of Patent: Jul. 9, 2019

(54) METHOD AND SYSTEM FOR PROVIDING AN UPDATE OF CODE ON A MEMORY-CONSTRAINED DEVICE

(71) Applicant: NEC EUROPE LTD., Heidelberg (DE)

(72) Inventors: Ghassan Karame, Heidelberg (DE); Wenting Li, Heidelberg (DE)

(73) Assignee: NEC CORPORATION, Tokyo (JP)

( * ) Notice: Subject to any disclaimer, the term of this patent is extended or adjusted under 35 U.S.C. 154(b) by 156 days.

(21) Appl. No.: 15/515,166

(22) PCT Filed: Sep. 30, 2014

(86) PCT No.: PCT/EP2014/070898
§ 371 (c)(1),
(2) Date: Mar. 29, 2017

(87) PCT Pub. No.: WO2016/050276
PCT Pub. Date: Apr. 7, 2016

(65) Prior Publication Data
US 2017/0243012 A1  Aug. 24, 2017

(51) Int. Cl.
*G06F 21/60* (2013.01)
*H04L 9/06* (2006.01)
*H04L 9/08* (2006.01)
*H04L 9/32* (2006.01)
(Continued)

(52) U.S. Cl.
CPC .......... *G06F 21/602* (2013.01); *H04L 9/0637* (2013.01); *H04L 9/0891* (2013.01); *H04L 9/3271* (2013.01); *H04W 12/10* (2013.01); *G06F 8/65* (2013.01); *H04L 2209/12* (2013.01); *H04L 2209/30* (2013.01)

(58) Field of Classification Search
CPC ... H04L 9/0637; H04L 9/0891; H04L 9/3271; H04L 2209/30; H04L 2209/12; H04W 12/10; G06F 21/602
See application file for complete search history.

(56) References Cited

U.S. PATENT DOCUMENTS

2011/0182424 A1*  7/2011  Grube ................. G06F 21/72
380/43

OTHER PUBLICATIONS

Daniele Perito et al: "Secure Code Update for Embedded Devices via Proofs of Secure Erasure", Sep. 20, 2010 (Sep. 20, 2010), Computer Security—Esorics 2010, Springer Berlin Heidelberg, Berlin, Heidelberg, pp. 643-662, XP019150436.
(Continued)

*Primary Examiner* — Baotran N To
(74) *Attorney, Agent, or Firm* — Leydig, Voit & Mayer, Ltd.

(57) ABSTRACT

A method for providing an update of code on a memory-constrained device includes a) determining a minimum necessary compressed code space (MNCCS) of the update of code, b) dividing the update of code into a plurality of chunks, c) applying an All-Or-Nothing Encryption scheme (AONE) on each chunk, d) providing integrity information of least one intermediate ciphertext block of each AONE encrypted chunk, e) verifying integrity of the one or more intermediate ciphertext blocks based on the provided integrity information, f) providing the encryption key of the AONE for decryption of the update of code if integrity was verified, and g) decrypting the intermediate ciphertext blocks using the provided encryption key and updating the code.

13 Claims, 2 Drawing Sheets

(51) Int. Cl.
*H04W 12/10* (2009.01)
*G06F 8/65* (2018.01)

(56) References Cited

OTHER PUBLICATIONS

Ghassan O Karame et al: "Securing Cloud Data in the New Attacker Model", International Association for Cyptologic Research, vol. 20140718:123221, Jul. 16, 2014 (Jul. 16, 2014), pp. 1-19, XP061016652.
Guiseppe Ateniese et al: "Entangled Cloud Storage", International Association for Cyptologic Research, vol. 20140214:214932, Feb. 14, 2014 (Feb. 14, 2014), pp. 1-28, XP061015036.

* cited by examiner

METHOD AND SYSTEM FOR PROVIDING AN UPDATE OF CODE ON A MEMORY-CONSTRAINED DEVICE

CROSS REFERENCE TO RELATED APPLICATIONS

This application is a U.S. National Stage Application under 35 U.S.C. § 371 of International Application No. PCT/EP2014/070898 filed on Sep. 30, 2014. The International Application was published in English on Apr. 7, 2016 as WO 2016/050276 A1 under PCT Article 21(2).

FIELD

The present invention relates to a method for providing an update of code on a memory-constrained device.

The present invention further relates to a system for providing an update of code, comprising a memory-constrained device on which the update of code is to be performed and a verifying entity to verify the update of code.

BACKGROUND

Mobile device security is gaining increasing importance nowadays. There is a wide range of possible methods to secure mobile devices. For example one conventional method is to establish a static root of trust and/or dynamic root of trust in various computing environments. This serves either to attest that an untrusted environment can provide some security guarantees and/or to create a trusted sub-environment within an untrusted computing environment.

In this respect there are two general conventional methods. The first conventional method relies simply on embedding TPM chips—trusted platform module chips—within mobile devices and establishing a root of trust within the mobile device itself. Such a method is for example disclosed in the non-patent literature "Bootstrapping Trust in Commodity Computers.", of B. Parno, J. M. McCune, A. Perrig IEEE S&P 2010, in "OSLO: Improving the security of Trusted Computing", of Bernhard Kauer, in the non-patent literature of the Trusted Computing Group http://www.trustedcomputinggroup.org and in the non-patent literature of IBM 4758 Basic Services Manual: http://www-03.ibm.com/security/cryptocards/pdfs/IBM_4758_Basic_Services_Manual_Release_2_54.pdf.

However, while there are several architectures for standard personal computer platforms being able to support an establishment of a root of trust this conventional method is rather immature for mobile devices.

A second conventional method uses embedded secret keys within the mobile phone smart card as means to authenticate the mobile device to external entities and/or to bootstrap a trusted computing base in the mobile device itself, for example disclosed in the non-patent literature of Kalman, G., Noll, J., UniK, K.: SIM as secure key storage in communication networks, in: International Conference on Wireless and Mobile Communications (ICWMC) (2007), of Noll, J., Lopez Calvet, J. C., Myksvoll, K.: Admittance services through mobile phone short messages, in: International Multi-Conference on Computing in the Global Information Technology. pp. 77-82, IEEE Computer Society, Washington, D.C., USA (2006) or in the non-patent literature of Mantoro, T., Milisic, A.: Smart card authentication for Internet applications using NFC enabled phone in: International Conference on Information and Communication Technology for the Muslim World (ICT4M) (2010).

However, current mobile phone smart cards like SIM-cards cannot fully mimic the functionality of existing TPMs. Further they do not support restricted operations on platform configuration registers PCR and additionally they can be cloned. Therefore, SIM-cards cannot or are at least unlikely to provide alone for a solution to bootstrap trust in a device.

One possibility to strengthen mobile device security by relying on a minimal hardware assumption is to ensure a secure boot process and then rely on an integrity measurement architecture IMA, for example disclosed in the non-patent literature of IBM Integrity Measurement Architecture, http://researcher.watson.ibm.com/researcher/view_project.php?id=2851 in conjunction with additional functionality from the smart card to ensure that the executing code is always correct. Securing the boot process of a mobile device can be achieved by ensuring that in every boot the device re-initializes its entire memory with a new correct code. Since all the memory including the random access memory RAM of the mobile device will be purged any malware that has been installed on the device will be automatically deleted.

Conventional secure code update protocols, for example disclosed in the non-patent literature of Daniele Perito, Gene Tsudik: "Secure Code Update for Embedded Devices via Proofs of Secure Erasure", in: Proceedings of ESORICS 2010 send the code to be updated encrypted using a secret key in M-E bits of data to the mobile device at the bootstrap time wherein M is the bit size of the total memory of the memory-constrained device and E is the minimum size for the essential code for the update. Once this code is received by the mobile device a verifier conducts a proof-of-retrievability POR protocol, for example disclosed in the non-patent literature of Shacham, H., and Waters, B, "Compact Proofs of Retrievability", in: ASIACRYPT (2008), pp. 90-107, of Juels, A., and J R., B. S. K. PORs: Proofs Of Retrievability for Large Files, in: ACM Conference on Computer and Communications Security (2007), pp. 584-597, and in the non-patent literature of Ateniese, G., Burns, R. C., Curtmola, R., Herring, J., Kissner, L., Peterson, Z. N. J., and Song, D. X, "Provable data possession at untrusted stores", in: ACM Conference on Computer and Communications Security (2007), pp. 598-609, to verify that the mobile device has indeed stored all the M-E bits of the encrypted data.

Although this ensures a secure code update, these proof-of-retrievability POR protocols are only probabilistic: An adversary has therefore a non-negligible probability of deleting some parts of the encrypted code to save space and store malware and still prove to the verifier that he has most of the encrypted code update. A second problem is that proof-of-retrievability POR protocols are typically interactive and require a verification of a large number of encrypted file blocks in order to ensure that the file is stored, for example with a 90% confidence.

SUMMARY

In an embodiment, the present invention provides a method for providing an update of code on a memory-constrained device, wherein a size of a total memory of the memory-constrained device is of bit size M, and wherein a size of a memory necessary for updating the code is of bit size E. The method includes a) determining a minimum necessary compressed code space (MNCCS) of the update of code by a verifying entity, b) dividing the update of code into a plurality of N chunks by the verifying entity, c) applying an All-Or-Nothing Encryption scheme (AONE) by the verifying entity on each chunk, the applying the AONE comprising: an encryption step using an encryption key on each chunk for encryption, such that the total encryption size of all encrypted chunks equals the size of the total memory subtracted with the determined MNCCS, outputting intermediate ciphertext blocks for each chunk, wherein an intermediate ciphertext block can be recovered after obtaining all ciphertext blocks of all AONE encrypted chunks but not the encryption key, and a transformation step transforming the intermediate ciphertext blocks and outputting a plurality of ciphertext blocks for each AONE encrypted chunk, d) providing integrity information of least one intermediate ciphertext block of each AONE encrypted chunk, e) verifying integrity of the one or more intermediate ciphertext blocks based on the provided integrity information, and f) providing the encryption key of the AONE for decryption of the update of code if integrity was verified.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
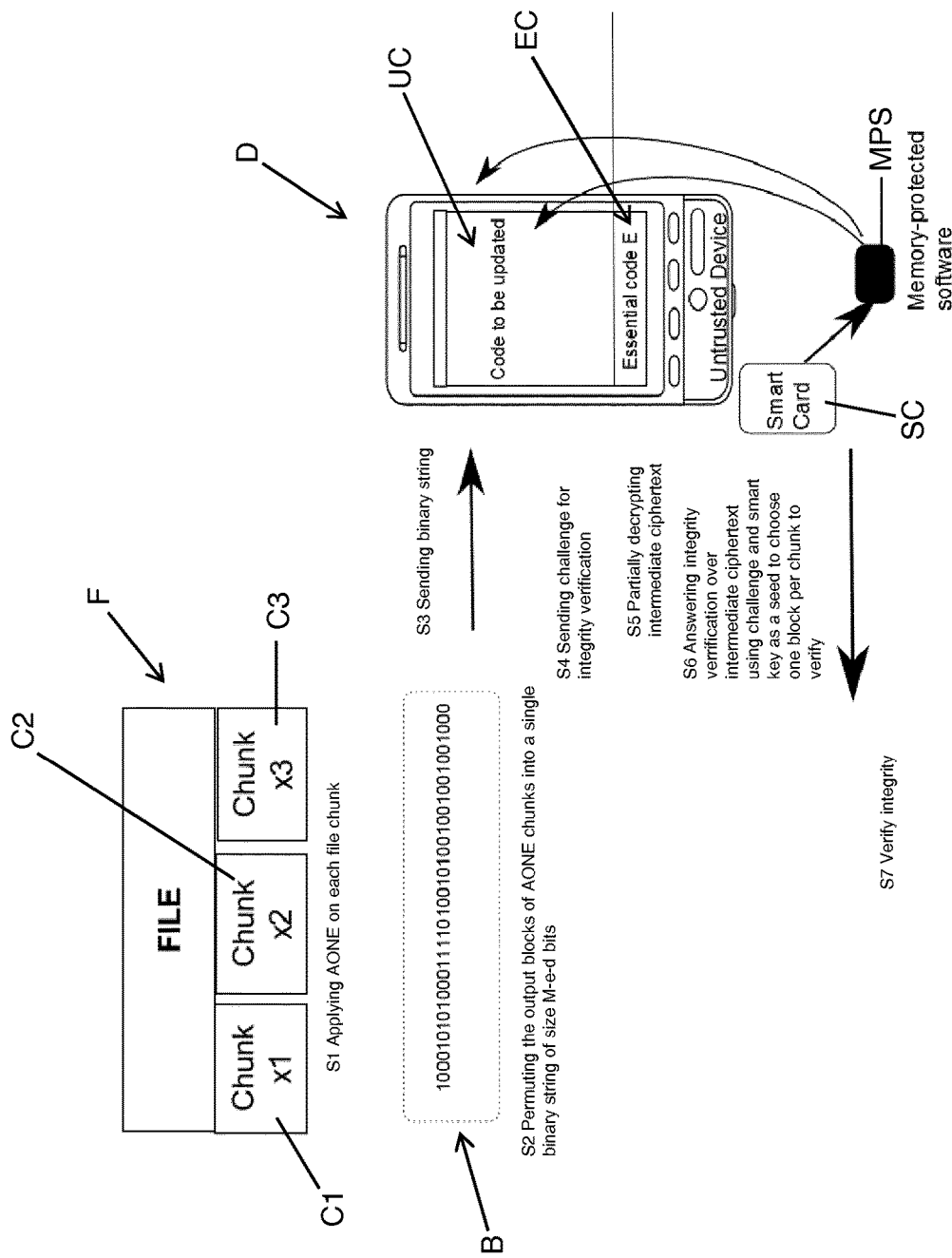
FIG. 1 shows steps of a method according to a first embodiment of the present invention.

Although applicable to any memory-constrained device, the present invention will be described with regard to mobile memory-constrained devices.

Although applicable to any integrity verification procedure the present invention will be described with regard to proof-of-retrievability POR schemes as integrity verification procedure.

A method and a system for providing an update of code on a memory-constrained device further strengthening security are described herein.

A method and a system for providing an update of code improving the performance of existing secure code update protocols. Are described herein A method and a system for providing an update of code, enabling a verifier to ensure with 100% certainty that the memory-constrained device has stored all the data while requiring the verification of only a small number of data blocks are described herein.

A method and a system for providing an update of code on a memory-constrained device being efficient, improving the performance and being easy to implement are described herein.

A method for providing an update of code on a memory-constrained device, wherein the size of the total memory of the device is of bit size M and wherein the size of the memory necessary for updating the code is of bit size E, is defined according to an embodiment of the invention. The method is characterized by the steps of:

a) Determining the minimum necessary compressed code space—MNCCS—of the code update by a verifying entity,
b) Dividing the update code into a plurality of N chunks by said verifying entity,
c) Applying an All-Or-Nothing Encryption scheme—AONE—by the verifying entity on each chunk, comprising
   an encryption step using an encryption key on each separate chunk for encryption, such that the total encryption size of all encrypted chunks equals the size of the total memory subtracted with said determined MNCCS, outputting intermediate ciphertext blocks for each chunk, wherein an intermediate ciphertext block can be recovered after obtaining all ciphertext blocks of all AONE encrypted chunks but not the encryption key and
   a transformation step transforming the intermediate ciphertext blocks and outputting a plurality of ciphertext blocks for each encrypted chunk—AONE encrypted chunk—,
d) Providing integrity information of least one intermediate ciphertext block of each AONE encrypted chunk,
e) Verifying the integrity of said one or more intermediate ciphertext blocks based on the provided integrity information,
f) Providing said encryption key of the AONE for decryption of the code update if integrity was verified and preferably
g) Decrypting the intermediate ciphertext blocks using the provided encryption key and updating the code.

A system for providing an update of code, comprising a memory-constrained device on which the update of code is to be performed and a verifying entity to verify the update of code, wherein the size of the total memory of the device is of bit size M and wherein the size of the memory necessary for updating the code is of bit size E, is defined according to an embodiment of the invention. The system is characterized in that the verifying entity is adapted to perform the following steps:

a) Determining the minimum necessary compressed code space—MNCCS—of the update code,
b) Dividing the update code into a plurality of N chunks,
c) Applying an All-Or-Nothing Encryption scheme—AONE—by the verifying entity on each chunk, comprising
   an encryption step using an encryption key on each separate chunk for encryption, such that the total encryption size of all encrypted chunks equals the size of the total memory subtracted with said determined MNCCS, outputting intermediate ciphertext blocks for each chunk, wherein an intermediate ciphertext block can be recovered after obtaining all ciphertext blocks of all AONE encrypted chunks but not the encryption key and
   a transformation step transforming the intermediate ciphertext blocks and outputting a plurality of ciphertext blocks for each encrypted chunk—AONE encrypted chunk—, and
d) Sending the AONE encrypted chunks to the memory-constrained device,
g) Verifying the integrity of said one or more intermediate ciphertext blocks based on the provided integrity information,
h) Providing said encryption key of the AONE for decryption of the code update if integrity was verified.
and that the memory-constrained device is adapted to perform the following steps e) Obtaining the the AONE encrypted chunks from the verifying entity, f) Providing integrity information of least one intermediate ciphertext block of each AONE encrypted chunk, and preferably:

i) Receiving by said verifying entity the encryption key of the AONE for decryption of the code update and j) Decrypting the intermediate ciphertext blocks using the received encryption key and updating the code.

A secure code update protocol for memory-constrained devices combining the use of several All-or-nothing encryptions AONEs over an actual code update with an integrity verification scheme significantly improving the performance of existing secure code update protocols while strengthening their security offerings are described herein.

With 100% certainty it can be ensured that the memory-constrained device has stored all the data according to an embodiment described herein.

According to the invention it has been further recognized that for the verification only a small number of data blocks is required.

Security and performance is significantly enhanced by an embodiment described herein, for example performance is improved in terms of computation and communication overhead compared with conventional methods and systems.

According to a preferred embodiment for performing step a) the minimum size E of the necessary code and the maximum compression over the minimum size E of the necessary code are estimated. By estimation a fast while reliable determination of the MNCCS can be achieved.

According to a further preferred embodiment for performing step a) the decompression size for decompression of the compressed necessary code is estimated. This also improves the performance without reducing the high security.

According to a further preferred embodiment the MNCCS is set as the sum of said estimated compressed minimum size and said decompression size. This enables in a fast an efficient way to determine the MNCCS.

According to a further preferred embodiment the code update is first divided into a number of m plaintext blocks wherein, if necessary, the value zero is padded to the code update to achieve said m plaintext blocks and second step b) is performed wherein the chunks are of equal size. This allows in an efficient way to divide the code update into said N chunks.

According to a further preferred embodiment the AONE is performed by first encrypting each chunk using a semantic security function in the encryption step and second XORing the outputted encrypted blocks for each chunk in the transformation step resulting in a number of ciphertext blocks which is higher than the number of plaintext blocks of each chunk. This enables for example to perform an All or Nothing Encryption scheme AONE efficiently enhancing the performance while ensuring the security.

According to a further preferred embodiment the location of ciphertext blocks is permuted and permutation reference information is generated for sending the permuted ciphertext blocks and the permutation reference information to said memory-constrained device by said verifying entity. This enables the memory-constrained device upon receiving a challenge to compute e.g. a proof of retrievability efficiently. Further the data to be transmitted from the verifying entity to the memory-constrained device is limited to the essential information for providing integrity information.

According to a further preferred embodiment for performing step d) the intermediate ciphertext block to be recovered is chosen randomly out of the ciphertext blocks for each chunk. This further enhances the security since an adversary does not know which block for the integrity verification is used.

According to a further preferred embodiment for providing integrity information of intermediate ciphertext blocks, a single intermediate ciphertext block is chosen from each AONE encrypted chunk using a secret based on a secret key provided by an external supplier, preferably in form of a smart card secret key and/or a challenge from the verifying entity. This enables an efficient and reliable way to provide the integrity information.

According to a further preferred embodiment for providing integrity information the Merkle root of the tree formed by all chosen blocks is determined and used. A Merkle root of tree has the advantage that the Merkle root can be easily provided and that a Merkle hashtree is easy to realize and has an $O(\log(m))$ complexity ensuring efficiency.

According to a further preferred embodiment for providing integrity information a proof of retrievability POR is performed over chosen intermediate ciphertext blocks. This enables to efficiently perform a reliable integrity verification for the complete code update.

According to a further preferred embodiment the total memory of the device is much bigger than the size of the memory necessary for updating the code, preferably the relation is at least 5:1, preferably at least 10:1, preferably at least 100:1, preferably at least 1000:1, preferably at least 100.000:1. One of the advantages is that the estimation of the essential code can then be performed more efficiently. Also estimation errors are reduced due to the small code size compared to the total memory.

FIG. 1 shows steps of a method according to a first embodiment of the present invention.

In FIG. 1 a schematic view of an access-control based embodiment is shown.

A file F is divided into a plurality of chunks C1, C2, C3. Then in step S1 an All-or-Nothing Encryption is applied on each file chunk C1, C2, C3 outputting a plurality of encrypted blocks—AONE blocks—for each chunk C1, C2, C3.

Then in a further step S2 the output blocks of the All-Or-Nothing encryption chunks are permuted, preferably using a pseudo-random permutation function into a single binary string B of the size M-e-d bits wherein M is the total size of the memory of the memory-constrained device, and e+d is the minimum essential compressed code space MNCCS in bits.

In a next step S3 the binary string B is sent to the memory-constrained device D. The memory-constrained device D comprises the essential code EC and a smart card SC provides a memory-protected software MPS interacting with the code to be updated UC.

After sending the binary string B, in a next step S4 a challenge c by a verifying entity is sent to verify the integrity of intermediate ciphertext blocks. The intermediate ciphertext blocks may be chosen randomly out of the plurality of AONE blocks. For example one intermediate ciphertext block from each chunk is sampled randomly using a secret $H(c\|K_s)$ where c is the provided challenge and $K_s$ is the smart card secret key of the smart card SC which is also known to the verifying entity and H is a Hash-function. The challenge may for example be an index of a chosen intermediate ciphertext block.

In a next step S5 the memory-constrained device D partially decrypts the intermediate ciphertext blocks, Integrity information of each intermediate ciphertext block is then provided using an integrity verification scheme, for example a proof of retrievability scheme POR based on the decrypted intermediate ciphertext block(s).

In a next step S6 the response/answer of the integrity verification scheme including the integrity information over the intermediate ciphertext blocks using said challenge and said smart card key $K_s$ as a seed to choose one block per chunk to verify is sent to the verifying entity.

In a next step S7 the integrity of the intermediate ciphertext blocks is verified based on the received integrity information i.e. the verifier or verifying entity checks to see whether the integrity information of each chosen intermediate ciphertext block is correct. If the verification passes, the verifying entity provides the All-Or-Nothing encryption key K and the memory-constrained device D can decrypt the intermediate ciphertext blocks for the code update to acquire the plaintext of the code update for updating the code on the memory-constrained device D.

The All-or-Nothing-Encryption AONE is preferably defined by the following procedures:

Key generation procedure: On input a security parameter, a key generation procedure outputs a key K.

Encryption procedure: On input of a plaintext p which is comprised of m blocks of size 1 bits each, and on input of an encryption key K, the encryption procedure AONEnc outputs n=m+1 blocks of ciphertext.

Decryption procedure. On input of said encryption key K, and the entire ciphertext blocks, the decryption procedure AONDec outputs the plaintext blocks p. If all ciphertext blocks are not available, then the decryption algorithm outputs NULL.

The encryption procedure of the AONE comprises two steps, namely a step for perform the encryption only creating so-called intermediate ciphertext and to perform a transformation on the output of the encryption, i.e. the intermediate ciphertext, to output ciphertext.

This general all-or-nothing encryption scheme is for example disclosed in the non-patent literature of R. Rivest, All-or-Nothing Encryption and The Package Transform. In Proceedings of Fast Software Encryption, pages 210-218, 1997 and of Anand Desai, "The Security of All-Or-Nothing Encryption: Protecting Against Exhaustive Key Search", In Proceedings of CRYPTO, 2000.

Figure 2:
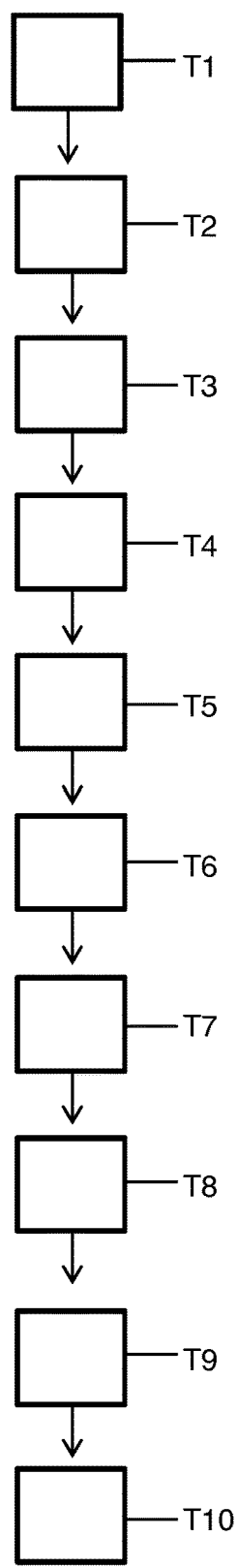
FIG. 2 shows steps of a method according to a second embodiment of the present invention.

FIG. 2 shows steps of a method according to a second embodiment of the present invention.

In FIG. 2 the second embodiment of the present invention unfolds as follows

In a first step T1 the remote verifier estimates the minimum size E for essential code. The verifier then estimates the maximum compression over E. e refers to the minimum size that E can be compressed to. The verifier also estimates the size d in bits required for decompression of e.

In a second step T2 a verifier encrypts the code update into (M-e-d) bits as follows: The verifier pads the code update with the necessary "0" to reach m plaintext blocks with padded zeros. The original m plaintext blocks are then divided into N equal sized chunks. Each chunk contains m/N blocks of original plaintext blocks. Overall, the N chunks occupy (M-e-d) bits of space.

In a third step T3 AONE is applied on each separate chunk. More specifically, in a preferred embodiment, each chunk is encrypted using a semantic security encryption function in a first step creating intermediate ciphertext blocks, and then all the output blocks are XORed together into tin a transformation step. The output of the AONE is then the XOR of each intermediate ciphertext block of the encryption scheme with t. Such an AONE encryption scheme is for example disclosed in the non-patent literature of Ghassan Karame, Claudio Soriente, Krzysztof Lichota, Srdjan Capkun, Technical Report, available from: https://eprintiacr.org/2014/556.pdf.

In a fourth step T4 the verifier then permutes the location of the output of the AONE blocks.

In a fifth step T5 the verifier sends all the permuted blocks of AONE to the memory-constrained device.

In a sixth step T6 the verifier sends the structure with which AONE has been applied to each chunk.

In a seventh step T7 the verifier sends a challenge c to the memory-constrained device, for example comprising an index for a chosen intermediate ciphertext block to be verified.

In an eighth step T8 the device computes integrity information over one intermediate ciphertext block from each encrypted chunk that is sampled randomly using secret $H(c\|Ks)$, where Ks is the smart card secret key, which is also known to the verifier and c is the received challenge.

In a ninth step T9 the verifier checks to see whether the integrity of each chosen intermediate ciphertext block based on the integrity information is correct. As an embodiment, the integrity information could be provided by determining the Merkle root of the tree formed by all the chosen intermediate ciphertext blocks, or by performing a POR over the chosen intermediate ciphertext blocks.

In a tenth step T10 if the verification passes, the verifier sends the AONE encryption key K, and the memory-constrained device can decrypt the data to acquire the plaintext code update.

The present invention can be used in a multi-cloud storage system being able to leverage a number of commodity cloud providers with the goal of distributing trust across different administrative domains. For example such a multi-cloud storage system comprises a plurality of storage servers and a plurality of users and each server can appropriately authenticate users.

In summary the present invention in particular enables to divide the code into chunks, encrypting it using an efficient all-or-nothing encryption AONE and combining it with integrity verification of a single block of each all-or-nothing encrypted chunk.

The present invention further enables a combination of all-or-nothing encryption AONE and integrity verification schemes like a proof-of-retrievability to construct a secure code update protocol reducing the computation and communication overhead of existing conventional protocols while enhancing the security of secure code update processes.

The present invention preferably further provides a method comprising the steps of
1) Computing the minimum essential compressed code space e+d
2) Dividing the plaintext code update into chunks.
3) Encrypting each chunk using AONE such that the total encryption size is (M-e-d).
4) Verifying the integrity of a single randomly chosen intermediate ciphertext of each AONE chunk.
5) If verification passes, sending the decryption key of the AONE to the device.

Embodiments of the present invention provide inter alia their following advantages. The present invention enables to ensure with a 100% certainty that a device has stored all the data while requiring the verification of only a small number of data blocks. Further the present invention improves the performance of conventional secure code update protocols while significantly strengthening their security offerings.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A method for providing a code update on a memory-constrained device, the method comprising:
   determining, by a verifying entity, a minimum necessary compressed code space (MNCCS) of the code update;
   dividing, by the verifying entity, the code update into N chunks;
   applying, by the verifying entity, an All-Or-Nothing Encryption (AONE) scheme on each chunk, wherein applying the AONE scheme on each chunk further comprises:
      using an encryption key on each chunk, wherein the total size of all encrypted chunks equals the total memory size of the memory-constrained device minus the determined MNCCS, and outputting intermediate ciphertext blocks for each chunk, wherein an intermediate ciphertext block is recoverable after obtaining all ciphertext blocks of all encrypted chunks without the encryption key; and
      transforming the intermediate ciphertext blocks and outputting a plurality of ciphertext blocks for each encrypted chunk;
   sending, by the verifying entity, the encrypted chunks to the memory-constrained device;
   receiving, by the verifying entity, integrity information of at least one intermediate ciphertext block of each encrypted chunk from the memory-constrained device;
   verifying, by the verifying entity, integrity of the at least one intermediate ciphertext block based on the provided integrity information; and
   in response to the integrity of the at least one intermediate ciphertext block being verified, providing, by the verifying entity, the encryption key to the memory-constrained device to facilitate the memory-constrained device decrypting the intermediate ciphertext blocks using the provided encryption key and implementing the code update.

2. The method according to claim 1, wherein determining the MNCCS of the code update is based on an estimated minimum memory size for the code update and an estimated maximum compression over the minimum memory size for the code update.

3. The method according to claim 1, wherein determining the MNCCS of the code update is based on an estimated decompression size for decompression of a compressed necessary code.

4. The method according to claim 1, wherein the MNCCS is set as the sum of an estimated compressed minimum size and a decompression size.

5. The method according to claim 1, wherein the N chunks are of equal size, and wherein prior to dividing the code update into the N chunks, the code update is padded with one or more zeroes and divided into a number m of plaintext blocks.

6. The method according to claim 1, wherein using the encryption key on each chunk is based on a semantic security function, and wherein transforming the intermediate ciphertext blocks comprises XORing all intermediate ciphertext blocks for each chunk, resulting in a number of ciphertext blocks which is higher than a number of plaintext blocks of each chunk.

7. The method according to claim 1, wherein the ciphertext blocks are permuted and permutation reference information is generated by the verifying entity for sending the permuted ciphertext blocks and the permutation reference information to the memory-constrained device.

8. The method according to claim 1, wherein the at least one intermediate ciphertext block of each encrypted chunk received for verification is chosen randomly out of the intermediate ciphertext blocks of each encrypted chunk.

9. The method according to claim 1, wherein providing integrity information of at least one intermediate ciphertext block of each encrypted chunk is based on choosing a single intermediate ciphertext block from each encrypted chunk using a secret based on a smart card secret key provided by an external supplier.

10. The method according to claim 9, wherein providing integrity information of at least one intermediate ciphertext block of each encrypted chunk is based on a Merkle root of a tree formed by all chosen intermediate ciphertext blocks.

11. The method according to claim 9, wherein providing integrity information of at least one intermediate ciphertext block of each encrypted chunk is based on performing a proof of retrievability scheme (POR) over the chosen intermediate ciphertext blocks.

12. The method according to claim 1, wherein the total memory of the memory-constrained device is bigger than the memory size of the code update by a ratio of at least 5:1.

13. A system for providing a code update, the system comprising:
   a memory-constrained device; and
   a verifying entity;
   wherein the verifying entity is configured to:
      determine a minimum necessary compressed code space (MNCCS) of the code update;
      divide the code update into N chunks;
      apply an All-Or-Nothing Encryption (AONE) scheme on each chunk, wherein applying the AONE scheme on each chunk further comprises:
         using an encryption key on each chunk, wherein the total encryption size of all encrypted chunks equals the total memory size of the memory-constrained device minus the determined MNCCS, and outputting intermediate ciphertext blocks for each chunk, wherein an intermediate ciphertext block is recoverable after obtaining all ciphertext blocks of all encrypted chunks without the encryption key; and transforming the intermediate ciphertext blocks and outputting a plurality of ciphertext blocks for each encrypted chunk; and send the encrypted chunks to the memory-constrained device;

wherein the memory-constrained device is configured to:
receive the encrypted chunks from the verifying entity; and provide integrity information of least one intermediate ciphertext block of each AONE encrypted chunk to the verifying entity;

wherein the verifying entity is further configured to:
verify the integrity of the at least one intermediate ciphertext block based on the provided integrity information; and in response to the integrity of the at least one intermediate ciphertext block being verified, provide the encryption key to the memory-constrained device for decryption of the code update;

wherein the memory-constrained device is further configured to:
receive the encryption key for decryption of the code update; and decrypt the intermediate ciphertext blocks using the encryption key and implement the code update.

\* \* \* \* \*